(12) United States Patent
Miyahara et al.

(10) Patent No.: US 11,847,288 B2
(45) Date of Patent: Dec. 19, 2023

(54) TOUCH PANEL AND DISPLAY APPARATUS INCLUDING TOUCH PANEL

(71) Applicant: Mitsubishi Electric Corporation, Tokyo (JP)

(72) Inventors: Kageyasu Miyahara, Kumamoto (JP); Seiichiro Mori, Kumamoto (JP); Yusuke Shimasaki, Kumamoto (JP); Takeshi Ono, Tokyo (JP); Tae Orita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 113 days.

(21) Appl. No.: 17/166,753

(22) Filed: Feb. 3, 2021

(65) Prior Publication Data

US 2021/0247873 A1    Aug. 12, 2021

(30) Foreign Application Priority Data

Feb. 10, 2020 (JP) .................................. 2020-020278

(51) Int. Cl.
*G06F 3/044* (2006.01)

(52) U.S. Cl.
CPC .......... *G06F 3/0447* (2019.05); *G06F 3/0446* (2019.05)

(58) Field of Classification Search
CPC ............................. G06F 3/0447; G06F 3/0446
See application file for complete search history.

(56) References Cited

U.S. PATENT DOCUMENTS

| 6,452,514 | B1 | 9/2002 | Philipp | |
| 7,920,225 | B2 * | 4/2011 | Nishikawa | G06F 1/1626 349/12 |
| 2008/0100592 | A1 * | 5/2008 | Shigeno | G06F 3/0445 345/174 |
| 2010/0026662 | A1 * | 2/2010 | Oohira | G02F 1/1339 349/12 |

(Continued)

FOREIGN PATENT DOCUMENTS

| JP | 2011-028476 A | 2/2011 |
| JP | 2011-100364 A | 5/2011 |

(Continued)

OTHER PUBLICATIONS

"Notice of Reasons for Refusal" Office Action issued in JP 2020-020278; mailed by the Japanese Patent Office dated Sep. 13, 2022.

(Continued)

*Primary Examiner* — Amy Onyekaba
(74) *Attorney, Agent, or Firm* — Studebaker & Brackett PC (57) ABSTRACT

A touch panel includes a base substrate, a cover panel, a first electrode formed outside of a display region on a back surface of the cover panel, and a second electrode formed outside of the display region on a front surface of the base substrate. A pressure when the base substrate is pressed by the pointer through the cover panel is detected by measuring a change of a distance between the first electrode and the second electrode when the front surface of the cover panel is pressed as a change of electrostatic capacitance between the first electrode and the second electrode. The touch panel further includes a ground electrode formed on an outer peripheral side of the first electrode of the cover panel.

5 Claims, 11 Drawing Sheets

(56) References Cited

U.S. PATENT DOCUMENTS

| | | | | |
|---|---|---|---|---|
| 2011/0018826 A1* | 1/2011 | Shoji | G06F 3/0445 | 345/173 |
| 2011/0148811 A1* | 6/2011 | Kanehira | G06F 3/04166 | 324/661 |
| 2011/0157087 A1* | 6/2011 | Kanehira | G06F 3/0447 | 345/174 |
| 2011/0175845 A1 | 7/2011 | Honda et al. | | |
| 2011/0278078 A1* | 11/2011 | Schediwy | G06F 3/0446 | 702/41 |
| 2012/0075218 A1* | 3/2012 | Lin | G06F 3/0418 | 345/173 |
| 2012/0133496 A1* | 5/2012 | Aono | H03K 17/9625 | 340/407.2 |
| 2013/0027339 A1* | 1/2013 | Kodani | G06F 3/041 | 345/173 |
| 2013/0027340 A1* | 1/2013 | Kodani | H10N 30/302 | 310/365 |
| 2013/0068038 A1* | 3/2013 | Bolender | G01L 1/142 | 73/862.626 |
| 2013/0147739 A1* | 6/2013 | Berg | G06F 3/04164 | 345/173 |
| 2013/0229364 A1* | 9/2013 | Yu | G06F 3/0446 | 345/173 |
| 2013/0242485 A1 | 9/2013 | Ohtani et al. | | |
| 2014/0001025 A1 | 1/2014 | Hinata | | |
| 2014/0176832 A1* | 6/2014 | Imazeki | G06F 3/0446 | 349/12 |
| 2014/0184527 A1* | 7/2014 | Kim | G06F 3/0443 | 345/173 |
| 2014/0218335 A1* | 8/2014 | Teranishi | G06F 3/0446 | 345/174 |
| 2015/0015526 A1* | 1/2015 | Wang | G06F 3/0447 | 345/174 |
| 2015/0077652 A1* | 3/2015 | Lee | G06F 3/0446 | 349/12 |
| 2015/0083569 A1* | 3/2015 | Chang | G06F 3/0446 | 200/600 |
| 2015/0242029 A1* | 8/2015 | Kim | G06F 3/046 | 345/173 |
| 2015/0277643 A1* | 10/2015 | Kim | G06F 1/1626 | 345/173 |
| 2015/0293630 A1* | 10/2015 | Ishizaki | G06F 3/0448 | 345/174 |
| 2015/0346881 A1* | 12/2015 | Watazu | G06F 3/047 | 345/174 |
| 2016/0054607 A1* | 2/2016 | Ishizaki | G06F 3/0445 | 349/12 |
| 2016/0103544 A1* | 4/2016 | Filiz | G06F 3/0412 | 345/174 |
| 2016/0124570 A1* | 5/2016 | Kim | G06F 3/045 | 345/174 |
| 2016/0195971 A1* | 7/2016 | Ando | G06F 3/0445 | 345/174 |
| 2016/0202833 A1* | 7/2016 | Kim | G06F 3/0443 | 345/173 |
| 2017/0003535 A1* | 1/2017 | Du | G02F 1/136204 | |
| 2017/0024037 A1* | 1/2017 | Ishizaki | G06F 3/044 | |
| 2017/0031514 A1* | 2/2017 | Kimura | G02F 1/13338 | |
| 2017/0060329 A1* | 3/2017 | Yoon | G06F 3/0447 | |
| 2017/0220175 A1* | 8/2017 | Kim | G06F 3/0443 | |
| 2017/0262112 A1* | 9/2017 | Noguchi | G02F 1/13338 | |
| 2017/0269756 A1* | 9/2017 | Wang | G06F 3/0446 | |
| 2017/0277328 A1* | 9/2017 | Kurasawa | G06F 3/0412 | |
| 2017/0329439 A1* | 11/2017 | Jeong | G06F 3/0445 | |
| 2018/0031885 A1* | 2/2018 | Nakamori | G06F 3/04164 | |
| 2018/0059844 A1* | 3/2018 | Noguchi | G02F 1/1343 | |
| 2018/0074634 A1* | 3/2018 | Kurasawa | G06F 3/041662 | |
| 2018/0246611 A1* | 8/2018 | Kim | H10K 59/40 | |
| 2018/0307087 A1* | 10/2018 | Jung | G02F 1/133345 | |
| 2018/0335918 A1* | 11/2018 | Wang | G06F 3/0412 | |
| 2018/0348943 A1* | 12/2018 | Yoon | G06F 3/0412 | |
| 2019/0012017 A1* | 1/2019 | Kurasawa | G09G 3/3696 | |
| 2019/0220115 A1* | 7/2019 | Mori | G06F 3/0446 | |
| 2020/0285366 A1* | 9/2020 | Agari | G06F 3/0448 | |
| 2020/0371659 A1* | 11/2020 | Kim | G06F 3/044 | |

FOREIGN PATENT DOCUMENTS

| | | |
|---|---|---|
| JP | 2012-103761 A | 5/2012 |
| JP | 2019-125218 A | 7/2019 |
| WO | 00/044018 A1 | 7/2000 |
| WO | 2018/168423 A1 | 9/2018 |
| WO | 2021/044537 A1 | 3/2021 |

OTHER PUBLICATIONS

An Office Action; "Notice of Reasons for Refusal," mailed by the Japanese Patent Office dated Feb. 14, 2023, which corresponds to Japanese Patent Application No. 2020-020278 and is related to U.S. Appl. No. 17/166,753; with English translation.

* cited by examiner

| | | FIRST CASE | SECOND CASE | THIRD CASE | FOURTH CASE |
|---|---|---|---|---|---|
| S1·S3 | PROJECTED CAPACITIVE TOUCH SENSOR DETECTION AND DETERMINATION | DETECTION | DETECTION | NO DETECTION | NO DETECTION |
| S2·S4·S9 | ELECTROSTATIC CAPACITIVE PRESS DETECTION SENSOR DETECTION AND DETERMINATION | DETECTION | NO DETECTION | DETECTION | NO DETECTION |
| S6·S8 | OUTPUT OF POSITION COORDINATE AND PRESS INFORMATION | OUTPUT OF POSITION OUTPUT OF PRESS | OUTPUT OF POSITION NO OUTPUT OF PRESS | STOP OUTPUT | STOP OUTPUT |
| | UPDATE OF BASELINE FOR PROJECTED CAPACITIVE TOUCH SENSOR DETECTION | NO UPDATE | NO UPDATE | NO UPDATE | UPDATE |
| S10 | UPDATE OF BASELINE FOR ELECTROSTATIC CAPACITIVE PRESS DETECTION SENSOR DETECTION | NO UPDATE | NO UPDATE | NO UPDATE | UPDATE |

TOUCH PANEL AND DISPLAY APPARATUS INCLUDING TOUCH PANEL

BACKGROUND OF THE INVENTION

Field of the Invention

The present disclosure relates to a touch panel and a display apparatus including the touch panel.

Description of the Background Art

In recent years, display apparatuses including a touch panel have been used. The touch panel is an apparatus that identifies a position touched by a pointer such as a finger. The touch panel has been attracting attention as one of excellent user interface (UI) means. Touch panels of various methods, such as a resistive film method and an electrostatic capacitance method have been made into products.

As one touch panel of the electrostatic capacitance method, there is a touch panel of a projected capacitive method (see, for example, Japanese Patent Application Laid-Open No. 2012-103761). According to the projected capacitive method, touch can be detected even when a front surface side of sensors incorporated into the touch panel is covered by a protective plate such as a glass plate having a thickness of approximately several millimeters. With this method, the protective plate can be disposed on the front surface, and thus has advantages such as being excellent in robustness, being capable of touch detection even when gloves are worn, and having a long life owing to the absence of a movable part.

WO 00/044018 discloses a configuration in which a key matrix including an array of a plurality of drive and receive electrode pairs is provided. The electric field between the electrodes changes depending on an object, such as a finger, that comes into contact with the substrate. The change of coupling electrostatic capacitance (specifically, mutual electrode electrostatic capacitance) accompanying the above change is detected as a charge amount.

Further, in recent years, providing the touch panel of the projected capacitive method with a pressure detection function has been started to be proposed. For example, Japanese Patent Application Laid-Open No. 2011-028476 discloses an electrostatic capacitive input apparatus and a display apparatus provided with an input function. In the electrostatic capacitive input apparatus and the display apparatus provided with an input function, a first electrode for press position detection is provided on a first surface side facing a second substrate in a first substrate, and a plurality of second electrodes for press position detection are provided on the first surface of the flexible second substrate. Thus, when the second substrate is pressed with a pen or the like, electrostatic capacitance between the first electrode and the second electrodes is increased, thus enabling detection of a press position. An elastic member made of a gel-like sheet is provided between the first substrate and the second substrate.

In the display apparatus including the touch panel, a cover panel made of tempered glass or the like may be attached to the front surface. In the technology described in Japanese Patent Application Laid-Open No. 2011-028476, when the cover panel is attached, the second substrate and the cover panel need to be deformed at the time of a press, which may cause deterioration of sensitivity of pressure detection.

In addition, two layers of transparent electrodes are formed inside a display region as electrodes that can detect pressure, and thus there is a problem that display performance is deteriorated due to increase of reflectance and reduction of transmittance of the transparent electrodes. In order to avoid deterioration of display performance, it is conceivable to dispose the electrodes on an outer peripheral side of the display region. In that case, however, there is more influence received from static electricity and there is a possibility of electrostatic breakdown.

SUMMARY

The present disclosure has an object to provide a technology that enables enhancement of sensitivity of pressure detection and that enables enhancement of tolerance to static electricity.

A touch panel according to the present disclosure includes a touch sensor substrate having a rectangular shape in plan view, a cover panel, a first electrode, and a second electrode. In the touch sensor substrate, a sensor electrode configured to detect a touch position of a pointer is formed. The cover panel is fixed to one surface of the touch sensor substrate and is configured to be pressed by the pointer. The first electrode is formed outside of a display region on a surface of the cover panel on an opposite side of a surface to be pressed by the pointer. The second electrode is formed outside of the display region on one surface of the touch sensor substrate. The first electrode and at least a part of the second electrode overlap in plan view. The second electrode is formed at at least one corner portion of the touch sensor substrate, and is electrically separated from the sensor electrode. The pressure when the touch sensor substrate is pressed by the pointer through the cover panel is detected by measuring a change of a distance between the first electrode and the second electrode when the surface of the cover panel to be pressed by the pointer is pressed as a change of electrostatic capacitance between the first electrode and the second electrode. The touch panel further includes a ground electrode being formed on an outer peripheral side of the first electrode of the cover panel.

The touch panel includes the first electrode being formed outside of the display region on the surface of the cover panel on the opposite side of the surface to be pressed by the pointer, and the second electrode being formed outside of the display region on one surface of the touch sensor substrate. The second electrode is formed at at least one corner portion of the touch sensor substrate. Therefore, sensitivity of pressure detection can be enhanced. The touch panel further includes the ground electrode being formed on the outer peripheral side of the first electrode of the cover panel. Therefore, tolerance to static electricity can be enhanced.

These and other objects, features, aspects and advantages of the present disclosure will become more apparent from the following detailed description of the present disclosure when taken in conjunction with the accompanying drawings.

DESCRIPTION OF THE PREFERRED EMBODIMENTS

First Embodiment

Figure 1:
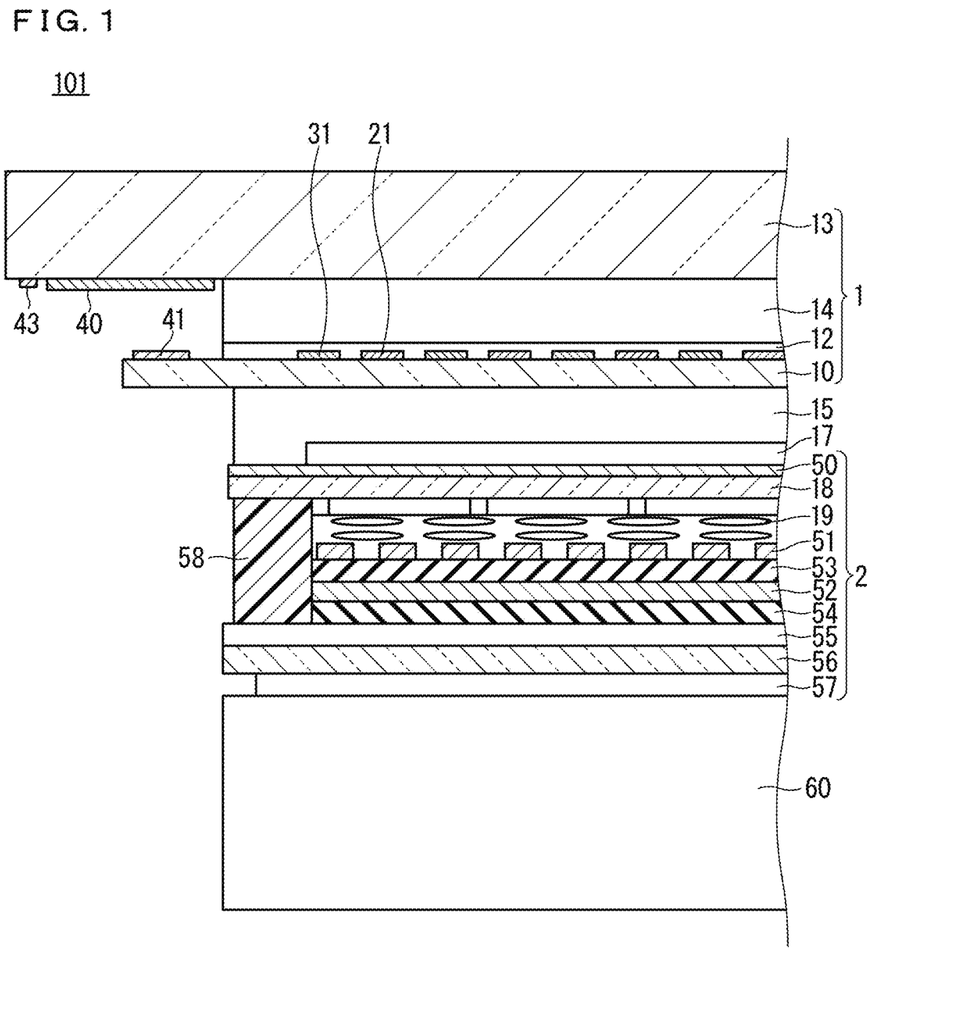
FIG. 1 is a partial cross-sectional diagram schematically illustrating a configuration of a display apparatus including a touch panel according to the first embodiment.
Figure 2:
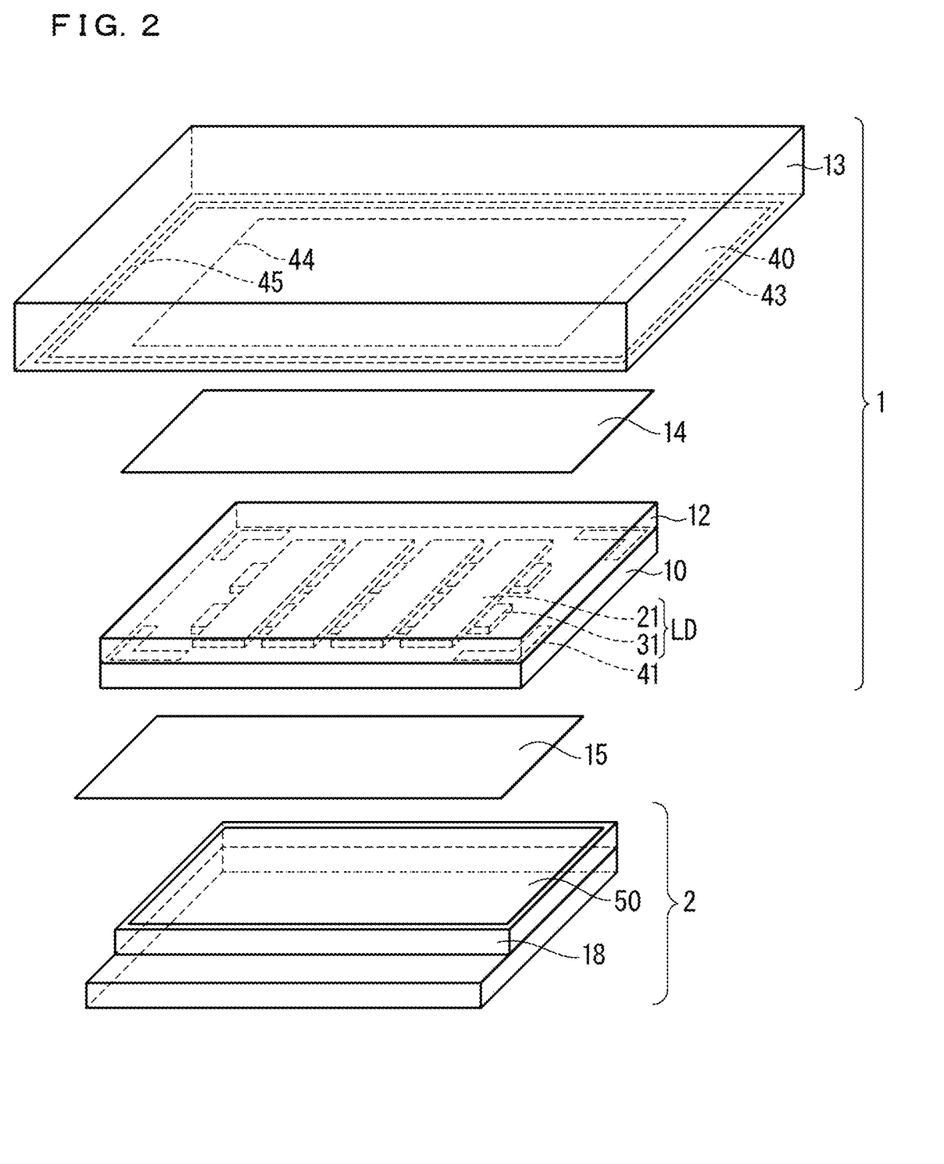
FIG. 2 is an exploded perspective view schematically illustrating a layer configuration of a front surface side of the display apparatus including the touch panel according to the first embodiment.
Figure 3:
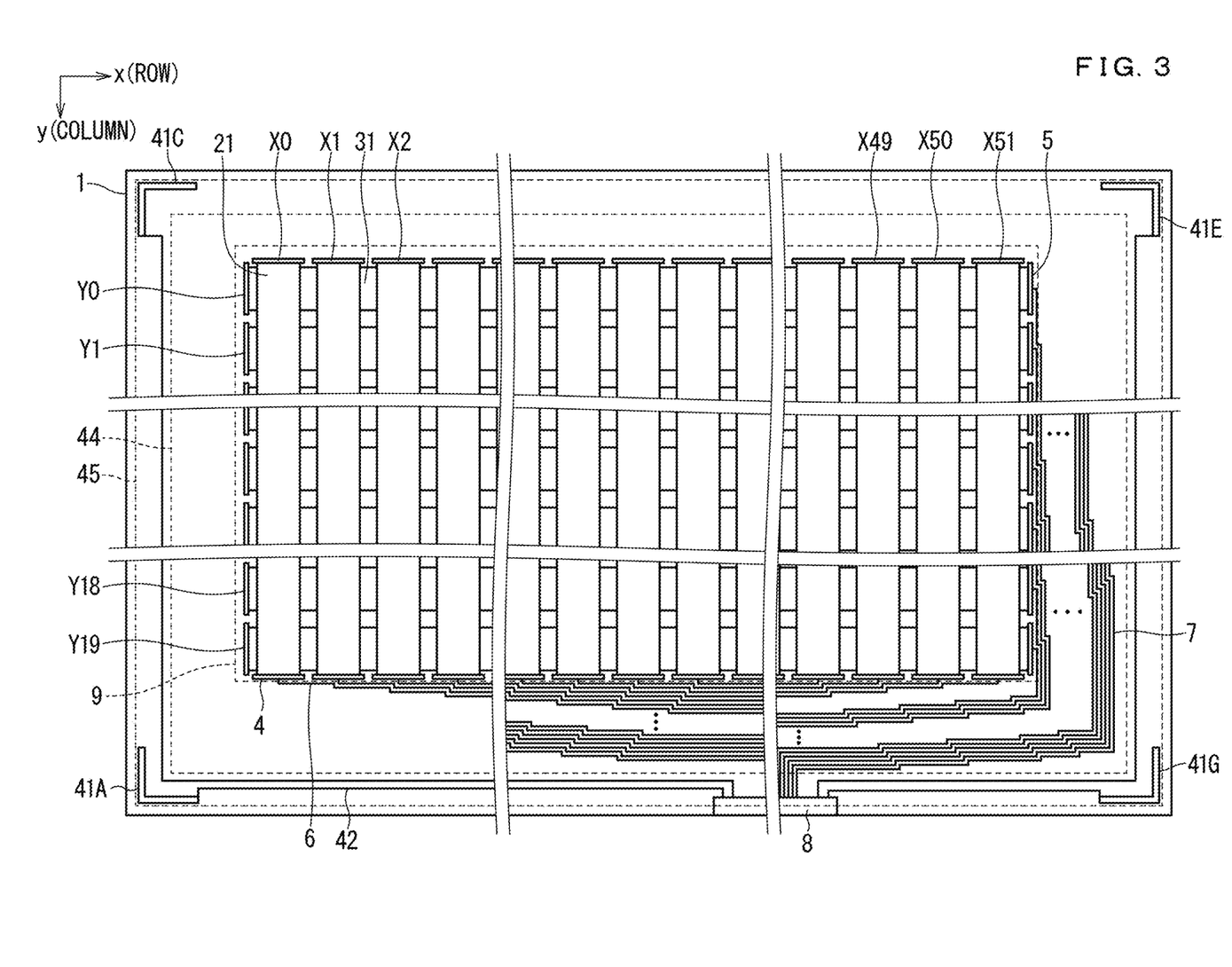
FIG. 3 is a plan view schematically illustrating a configuration of the touch panel according to the first embodiment.

The first embodiment will be described below with reference to the drawings. FIG. 1 is a partial cross-sectional diagram schematically illustrating a configuration of a display apparatus 101 including a touch panel 1 according to the first embodiment. FIG. 2 is an exploded perspective view schematically illustrating a layer configuration of a front surface side of the display apparatus 101 including the touch panel 1. FIG. 3 is a plan view schematically illustrating a configuration of the touch panel 1. Note that, in FIG. 2, the shape of each member is simplified in illustration.

As illustrated in FIG. 1, the display apparatus 101 is an apparatus that can identify the position indicated by a pointer such as a finger. The display apparatus 101 includes a touch panel 1, a liquid crystal panel 2, and a backlight unit 60. Note that, in FIG. 1, the backlight unit 60 is simplified in illustration. Further, a metal frame that covers the liquid crystal panel 2 and the backlight unit 60 is omitted.

The touch panel 1 includes a base substrate 10 as a touch sensor substrate, a cover panel 13, a first electrode 40, a second electrode 41, a ground electrode 43, and a position detection layer LD (see FIG. 2).

The cover panel 13 is fixed to a front surface being one surface of the base substrate 10, and is to be pressed by the pointer. In a display region of the cover panel 13, light is transmitted, whereas in an outer peripheral side of the display region, a conductive material such as a carbon paste is printed, and a first electrode 40 and a ground electrode 43 are further formed. Although the outer peripheral portion of the cover panel 13 may be printed black from the viewpoint of designability, the first electrode 40 and the ground electrode 43 are formed on a back surface side of the black print (not shown) in the present embodiment. Specifically, the first electrode 40 is formed outside of the display region on a surface of the cover panel 13 on the opposite side of the surface to be pressed by the pointer. Further, the ground electrode 43 is formed on the outer peripheral side of the first electrode 40 of the cover panel 13.

The formation of the first electrode 40 outside of the display region can reduce increase of reflectance and reduction of transmittance in the display region. Note that the ground electrode 43 is grounded through a conductive pattern (for example, a land) (not shown). Here, the "surface of the cover panel 13 to be pressed by the pointer" refers to a front surface of the cover panel 13, and the "surface of the cover panel 13 on the opposite side of the surface to be pressed by the pointer" refers to a back surface of the cover panel 13.

As illustrated in FIG. 1 and FIG. 2, the base substrate 10 is a transparent plate having a rectangular shape in plan view, and is made of glass or resin, for example. The touch panel 1 is fixed to the back surface of the cover panel 13 using a first adhesive 14 so that the position detection layer LD is located between the cover panel 13 and the base substrate 10.

Thus, the position detection layer LD is provided indirectly on the back surface of the cover panel 13 with the first adhesive 14 being interposed therebetween. Note that the position detection layer LD may be protected by being covered by the protective film 12. As the first adhesive 14, a transparent adhesive (optically clear adhesive (OCA)) or the like is used.

In order to implement position detection using the projected capacitive method, the position detection layer LD includes a plurality of column direction sensor electrodes 21, a plurality of row direction sensor electrodes 31, and an interlayer insulation film (not shown). The interlayer insulation film insulates the column direction sensor electrodes 21 and the row direction sensor electrodes 31 from each other in the thickness direction. Here, the plurality of column direction sensor electrodes 21 and the plurality of row direction sensor electrodes 31 correspond to sensor electrodes that detect a touch position of the pointer.

Next, with reference to FIG. 3, the details of the column direction sensor electrodes 21 and the row direction sensor electrodes 31 will be described. As illustrated in FIG. 3, in the detection region 9, the plurality of column direction sensor electrodes 21 extend in parallel with each other, and the plurality of row direction sensor electrodes 31 also extend in parallel with each other. The plurality of row direction sensor electrodes 31 intersect the plurality of column direction sensor electrodes 21. In other words, each of the row direction sensor electrodes 31 intersects the plurality of column direction sensor electrodes 21, and each of the column direction sensor electrodes 21 intersects the plurality of row direction sensor electrodes 31.

Electrodes X0 to X51 are specifically provided as the plurality of column direction sensor electrodes 21, and electrodes Y0 to Y19 are specifically provided as the plurality of row direction sensor electrodes 31. In this case, 52 column direction sensor electrodes 21 and 20 row direction sensor electrodes 31 are provided. However, the numbers of the plurality of column direction sensor electrodes 21 and row direction sensor electrodes 31 are not limited and may be any numbers. The column direction sensor electrodes 21 are connected to respective column terminals 4. The column terminals 4 are connected to an external terminal 8 through respective leading wires 6. The row direction sensor electrodes 31 are connected to respective row terminals 5. The row terminals 5 are connected to the external terminal 8 through respective leading wires 7.

Further, at four corner portions of the base substrate 10 on the outer peripheral side of the detection region 9 and the region in which the leading wires 6 and 7 are disposed, second electrodes 41 (41A, 41C, 41E, 41G) that are formed simultaneously with the column direction sensor electrodes 21 are respectively provided. The second electrodes 41 are connected to the external terminal 8 through respective leading wires 42. Here, the second electrodes are referred to as "second electrodes 41" unless the second electrodes are individually specified.

Note that the second electrodes 41 may be simultaneously formed with the row direction sensor electrodes 31 instead of the column direction sensor electrodes 21. In this manner, with the second electrodes 41 and their respective leading wires 42 and the column direction sensor electrodes 21 and the row direction sensor electrodes 31 being disposed so as to be electrically separated from each other, pressure detection and position detection can be independently performed.

The second electrodes 41 are formed outside of the display region on the front surface of the base substrate 10. The second electrodes 41 are located at positions facing the first electrode 40, and are disposed between an inner boundary 44 of the first electrode and a boundary 45 between the first electrode 40 and the ground electrode 43 in plan view. Specifically, the second electrodes 41 are disposed to be entirely covered by the first electrode 40. With this configuration, when a conductive pointer approaches the front surface of the cover panel 13, electrostatic capacitance formed between the pointer and the second electrodes 41 is shielded by the first electrode 40. As a result, the electrostatic capacitance coupled by the second electrodes 41 can be caused to change only by a change amount of the distance between the first electrode 40 and the second electrodes 41.

Note that, as long as the shielding performance of the first electrode 40 can be exerted, the second electrodes 41 need not necessarily be entirely covered by the first electrode 40, and it is only necessary that the first electrode 40 and at least a part of the second electrodes 41 overlap in plan view.

Further, on the outer peripheral side of the first electrode 40, specifically, on the outer peripheral side of the boundary 45 between the first electrode 40 and the ground electrode 43 in plan view, the ground electrode 43 is provided, which guards the inner peripheral side such that static electricity does not reach the inner peripheral side. There is a possibility that static electricity is generated, which damages a connected electronic circuit through the leading wires 6, 7, and 42 and the external terminal 8, such as when the pointer such as a finger of a person touches the front surface of the cover panel 13. The ground electrode 43 serves to forestall such occurrence.

Further, the second electrodes 41 are located on the outer peripheral side of the first adhesive 14, and thus an air layer is formed between the first electrode 40 and the second electrodes 41. This configuration enables generating a difference in a deformation amount between the cover panel 13 and the base substrate 10 when the pointer presses the front surface of the cover panel 13 as will be described later.

The column direction sensor electrodes 21, the row direction sensor electrodes 31, and the second electrodes 41 are made of a transparent conductor, and are made specifically of indium tin oxide (ITO), for example. It is sufficient that the column direction sensor electrodes 21 and the row direction sensor electrodes 31 be substantially transparent, and therefore a low-resistance material made of an aluminum alloy may be used, and a Metal-Mesh method, in which wires having a width of 2 µm or more and 3 µm or less are arranged in a mesh-like pattern with an aperture ratio of 90% or more, may be used. In that case, the second electrodes 41 can be electrodes having resistance lower than ITO.

Further, the leading wires 6, 7, and 42 are made of a low-resistance material made of an aluminum alloy. The aluminum alloy may be replaced with a low-resistance material made of a copper alloy, a silver alloy, or the like. Further, the second electrodes 41 may be made of the same metal material as the leading wires 6, 7, and 42.

As illustrated in FIG. 1, the liquid crystal panel 2 is fixed to a back surface of the touch panel 1 by using a second adhesive 15. Further, the backlight unit 60 is fixed to a back surface of the liquid crystal panel 2. Fixing of the liquid crystal panel 2 using the second adhesive 15 eliminates interfacial reflection with air, and produces advantages such as enhancement of outdoor visual recognizability. In a product mainly used indoors where outside light does not enter, the metal frame (not shown) covering the liquid crystal panel 2 and the touch panel 1 can be attached to each other with a double-sided tape by using a region other than the display region.

The liquid crystal panel 2 includes a color filter substrate (CF substrate) 18, an antistatic conductive film 50, a polarizing plate 17, a TFT substrate 56, a polarizing plate 57, a TFT 55, an insulation film 54, a pixel electrode 52, an alignment film 53, a common electrode 51, liquid crystals 19, and a sealing material 58. Note that the liquid crystal panel 2 has a general configuration, and thus description thereof is omitted.

Next, with reference to FIG. 4 and FIG. 5, a difference of the deformation amount between the cover panel 13 and the base substrate 10 when the front surface of the cover panel 13 is pressed by the pointer will be described.

When the front surface of the cover panel 13 is pressed by the pointer, the cover panel 13 and the base substrate 10 are deformed, and a difference is generated in the deformation amount generated in each of the cover panel 13 and the base substrate 10. FIG. 4 and FIG. 5 are graphs showing a difference of the deformation amount of the cover panel 13 and the base substrate 10 at the time of a press according to the first embodiment, in which these deformation amounts are calculated by using stress simulation. Note that the thickness of the cover panel 13 is 2.0 mm, the thickness of the base substrate 10 is 0.7 mm, and the thickness of the liquid crystal panel 2 is 1.5 mm.

Figure 4:
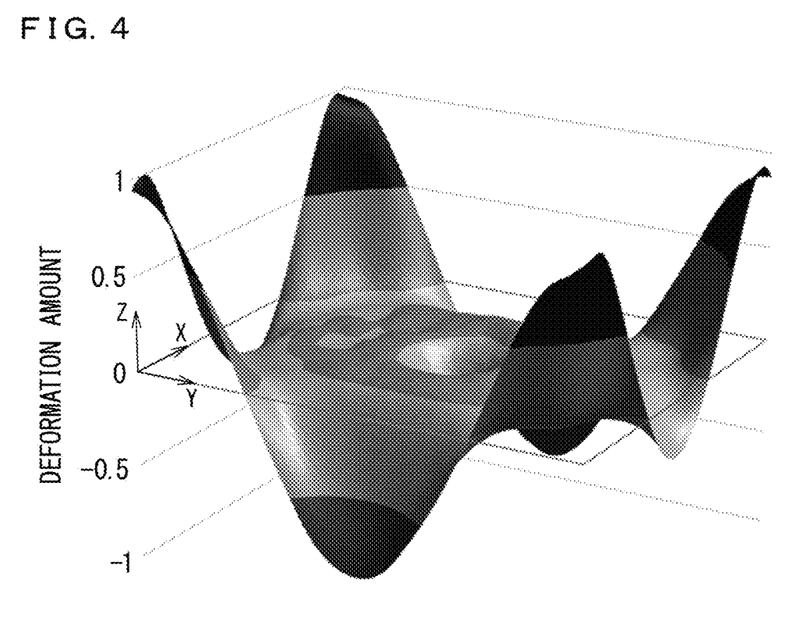
FIG. 4 is a graph showing a difference of the deformation amount between the cover panel and the base substrate at the time of a press according to the first embodiment.

FIG. 4 shows distribution of a difference of the deformation amount between the cover panel 13 and the base substrate 10 when a press of 1 N/cm$^2$ is applied to a center portion of the front surface of the cover panel 13 by a pointer having a diameter of 8 mm. The X-axis and the Y-axis of the graph represent coordinates of the base substrate 10. In the Z-axis of the graph, positive values represent a case where the deformation amount of the cover panel 13 is larger than the deformation amount of the base substrate 10, and negative values represent a case where the deformation amount of the base substrate 10 is larger than the deformation amount of the cover panel 13. Further, values in the Z-axis of the graph represent relative values, with a maximum value of the positive value being 1.

As shown in FIG. 4, it can be seen that a difference of the deformation amount is generated in the positive direction at four corner portions of the base substrate 10. This indicates that the distance between the cover panel 13 and the base substrate 10 is increased depending on a press.

Figure 5:
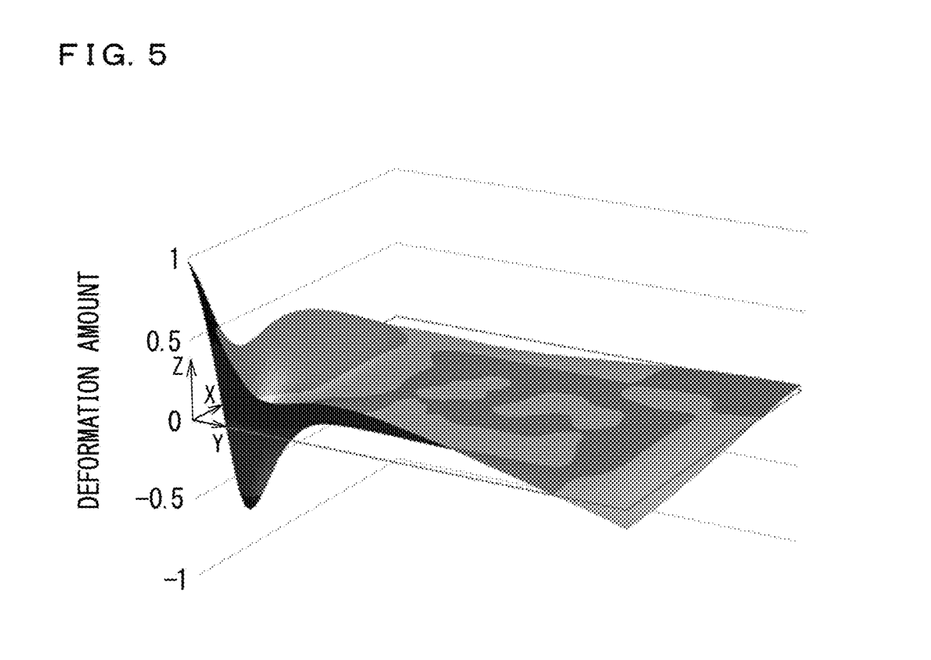
FIG. 5 is a graph showing a difference of the deformation amount between the cover panel and the base substrate at the time of a press according to the first embodiment.

FIG. 5 shows distribution of a difference of the deformation amount between the cover panel 13 and the base substrate 10 when a press of 1 N/cm² is applied to one corner portion of the display region on the front surface of the cover panel 13 by a pointer having a diameter of 8 mm. As shown in FIG. 5, it can be seen that a difference of the deformation amount is generated in the positive direction at one corner portion near the pressing position of the base substrate 10. This indicates that, similarly to the case of FIG. 4, the distance between the cover panel 13 and the base substrate 10 is increased depending on a press.

These differences of the deformation amount are generated due to weakening of a binding force of adhesion with the cover panel 13 in the base substrate 10 at an outer peripheral portion of the first adhesive 14. Further, in the present embodiment, the first electrode 40 and the second electrodes 41 are provided on the outer peripheral side of the first adhesive 14, which enables detection of the difference of the deformation amount generated between the cover panel 13 and the base substrate 10 as a change of electrostatic capacitance.

Further, as shown in FIG. 4 and FIG. 5, based on the fact that the difference of the deformation amount is generated at any one or all of the four corners of the base substrate 10 when the display region is pressed by the pointer, it can be understood that it suffices to form the second electrodes 41 at four corner portions of the base substrate 10 to detect pressure.

Further, a case of detecting pressure when only a specific display region is pressed is also assumed. In this case, when the second electrode 41 is formed at at least any one of the four corner portions of the base substrate 10, a wide pressure detection range can be achieved with a small number of electrodes.

From the above, it can be understood that pressure when the base substrate 10 is pressed by the pointer through the cover panel 13 can be detected by measuring a change of the distance between the first electrode 40 and the second electrodes 41 when the front surface of the cover panel 13 is pressed by the pointer as a change of electrostatic capacitance between the first electrode 40 and the second electrodes 41.

Figure 6:
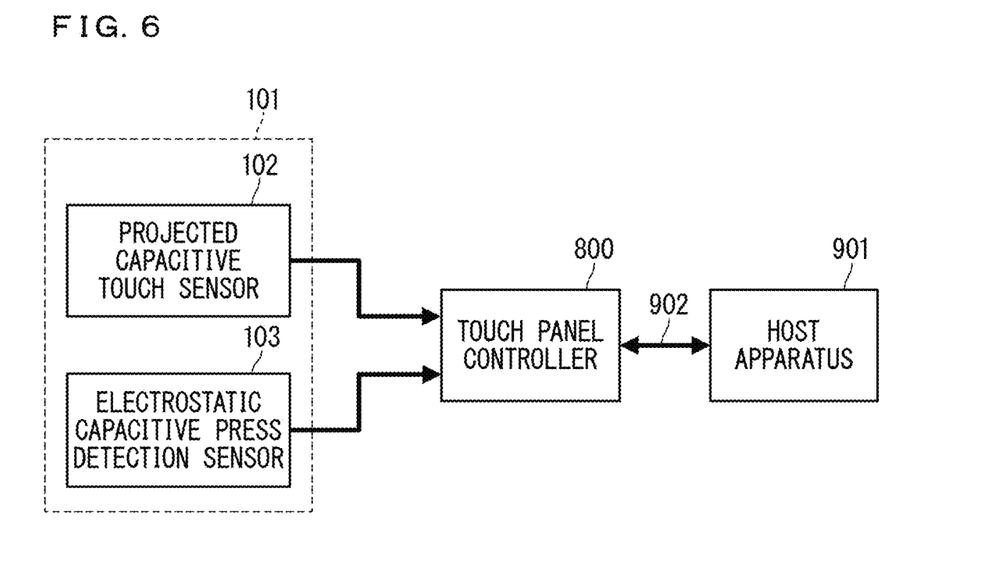
FIG. 6 is a diagram illustrating connection between the display apparatus including the touch panel, a touch panel controller, and a host apparatus according to the first embodiment.

Next, detection operation of the display apparatus 101 and a touch panel controller 800 will be described. Prior to the description, connection between the display apparatus 101, the touch panel controller 800, and a host apparatus 901 will be described. FIG. 6 is a diagram illustrating connection between the display apparatus 101, the touch panel controller 800, and the host apparatus 901.

The display apparatus 101 includes a projected capacitive touch sensor 102 and an electrostatic capacitive press detection sensor 103. The projected capacitive touch sensor 102 and the electrostatic capacitive press detection sensor 103 are configured with a common touch panel 1. Specifically, the touch panel 1 includes a projected capacitive touch sensor function and an electrostatic capacitive press detection sensor function.

The plurality of column direction sensor electrodes 21 and the plurality of row direction sensor electrodes 31 connected to the position detection layer LD of the projected capacitive touch sensor 102, the plurality of second electrodes 41 of the electrostatic capacitive press detection sensor 103, and the plurality of first electrodes 40 and ground electrodes 43 formed in the cover panel 13 are connected with pressure by using flexible printed circuits (FPCs) and an anisotropic conductive film (ACF). The FPCs are electrically connected to the touch panel controller 800 by using a connector or the like mounted to the touch panel controller 800.

The touch panel controller 800 is, for example, connected to the host apparatus 901 via a connection element 902 such as a connector and a cable, and outputs a position and a pressure pressed by the pointer to the host apparatus 901 as touch position coordinate information and press information generated in an arithmetic unit in the touch panel controller 800.

For communication between the touch panel controller 800 and the host apparatus 901, for example, a universal serial bus (USB), an inter-integrated circuit (I2C), a universal asynchronous receiver transmitter (UART), or the like is used.

Note that, regarding the projected capacitive touch sensor 102, a general matrix type in which sensor electrodes are disposed in the row direction and the column direction has been described. However, it is only necessary that the press position can be detected, and therefore a segment type in which the plurality of sensor electrodes are disposed in a block shape may be used with no problem. Regarding a detection method of electrostatic capacitance as well, there are many methods such as a self-capacitance type, a mutual capacitance type, or a method combining these, and the detection method is not limited.

The electrostatic capacitive press detection sensor 103 includes the first electrode formed in the cover panel 13, and the second electrodes 41 formed in the base substrate 10.

The touch panel controller 800 detects touch coordinates indicating a position that the pointer touches on the front surface of the cover panel 13 based on the change amount of the electrostatic capacitance detected by the projected capacitive touch sensor 102, and detects a pressing force of the pointer based on the change amount of the electrostatic capacitance detected by the electrostatic capacitive press detection sensor 103. Then, the touch panel controller 800 performs control of generating information including these detection results, whether or not there is a touch, and the like as touch information, control of outputting the generated touch information, and update of a reference value (hereinafter referred to as a "baseline") at the time of a steady state of detection by the projected capacitive touch sensor 102 and detection by the electrostatic capacitive press detection sensor 103. Note that the "steady state of detection by the projected capacitive touch sensor 102 and detection by the electrostatic capacitive press detection sensor 103" refers to a state in which there is no touch and press by the pointer.

Here, the control of generating the touch information includes generation of the touch information and stopping of generation of the touch information, and the control of outputting the touch information includes outputting of the touch information and stopping of output of the touch information.

Figure 7:
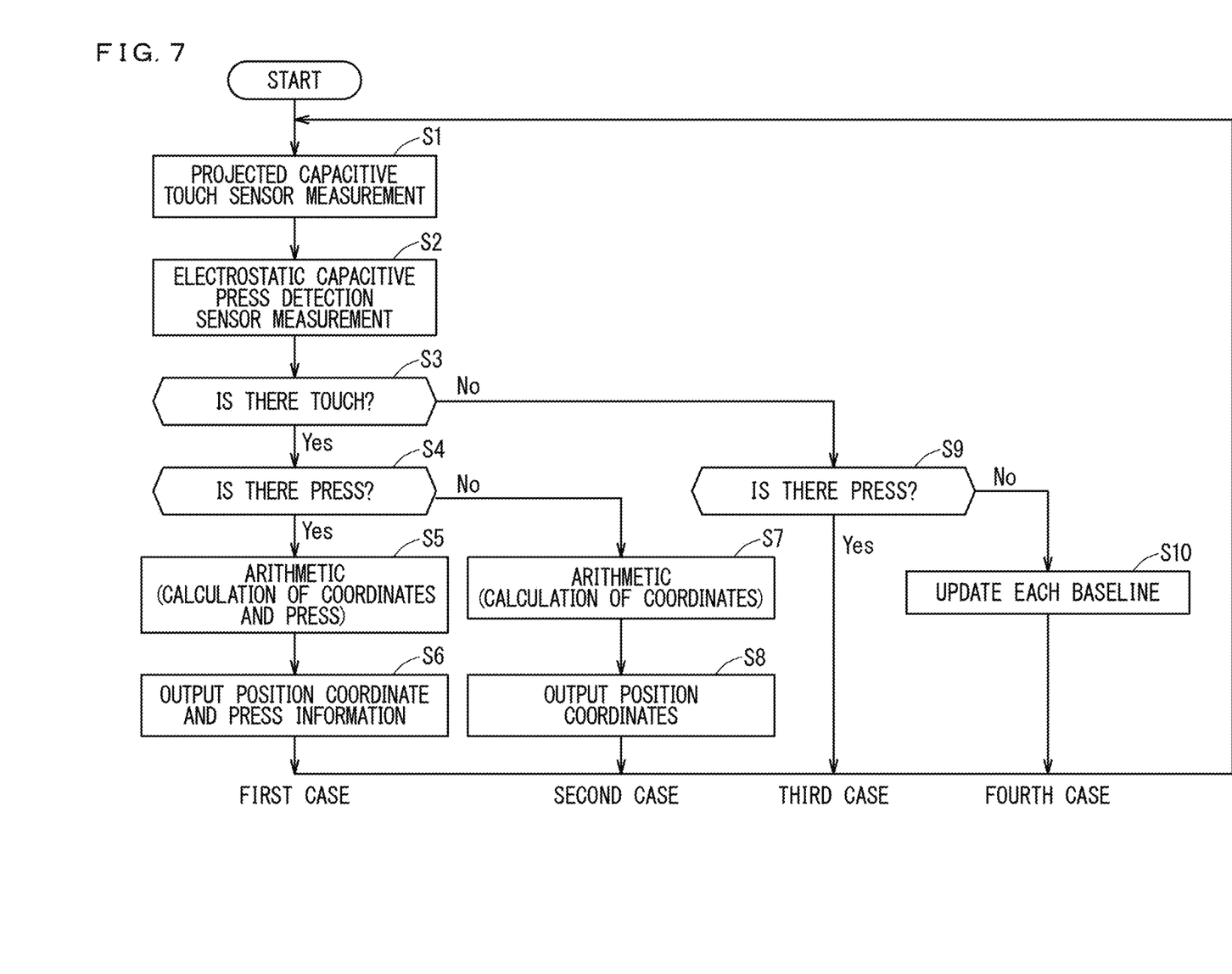
FIG. 7 is a flowchart illustrating detection operation of the display apparatus including the touch panel and the touch panel controller according to the first embodiment.

Subsequently, detection operation of the display apparatus 101 and the touch panel controller 800 will be described. FIG. 7 is a flowchart illustrating detection operation of the display apparatus 101 and the touch panel controller 800. In the flowchart, loop processing as follows is performed: the processing starts with processing of Step S1, a series of processing is executed, and the processing of Step S1 is performed again.

In Step S1, the touch panel controller 800 measures electrostatic capacitance formed between the pointer and the cover panel 13 by using the projected capacitive touch sensor 102.

In Step S2, the touch panel controller 800 measures electrostatic capacitance corresponding to the pressing force of the pointer by using the electrostatic capacitive press detection sensor 103. The touch panel controller 800 obtains four measurement values by using the second electrodes 41A, 41C, 41E, and 41G illustrated in FIG. 3, for example.

In Step S3, the touch panel controller 800 determines whether or not the electrostatic capacitance value measured in Step S1 exceeds a touch threshold for determining whether or not there is a touch. If it is determined that the electrostatic capacitance value exceeds the touch threshold, determination of "touch" is made (Yes in Step S3), the processing proceeds to Step S4, and determination as to whether or not there is a press is performed. If the electrostatic capacitance value is equal to or less than the touch threshold, determination of "no touch" is made (No in Step S3), the processing proceeds to Step S9, and determination as to whether or not there is a press is performed. The determination as to whether or not there is a press is, for example, determined by comparing the four measurement values and a threshold.

If it is determined as "press" in Step S4 (Yes in Step S4), in Step S5, the touch panel controller 800 performs calculation of position coordinates and a press value, in Step S6, outputs data obtained by adding the press information to the position coordinate information as coordinate data to the host apparatus 901 (first case), and the processing returns to Step S1.

On the other hand, if it is determined as "no press" in Step S4 (No in Step S4), in Step S7, the touch panel controller 800 performs calculation of position coordinates, in Step S8, outputs the position coordinate information as coordinate data to the host apparatus 901 (second case), and the processing returns to Step S1.

The coordinate data output in Step S8 includes information of the touch coordinates detected in a state in which pressure is not detected. For example, when a button for safe operation in an application processed in the host apparatus 901 corresponds to the position coordinates, the following operation can be performed in the application: if it is output of Step S6, processing is performed, whereas if it is output of Step S8, processing is not performed.

If determination of "no press" is made in Step S9 (No in Step S9), in Step S10, the touch panel controller 800 generates the latest baseline based on the electrostatic capacitance value measured in Step S1 and Step S2 and the baseline (fourth case), and the processing returns to Step S1. On the other hand, if determination of "press" is made in Step S9 (Yes in Step S9), the touch panel controller 800 does not update the baseline (third case), and the processing returns to Step S1.

Here, Step S9 is performed in order to confirm whether or not there is a problem in performing update of the baseline of Step S10. This is because a value in a state in which there is no touch and press needs to be reflected in the baseline. Note that the update of the baseline is performed so as to follow an environmental change such as a temperature change.

Figure 8:
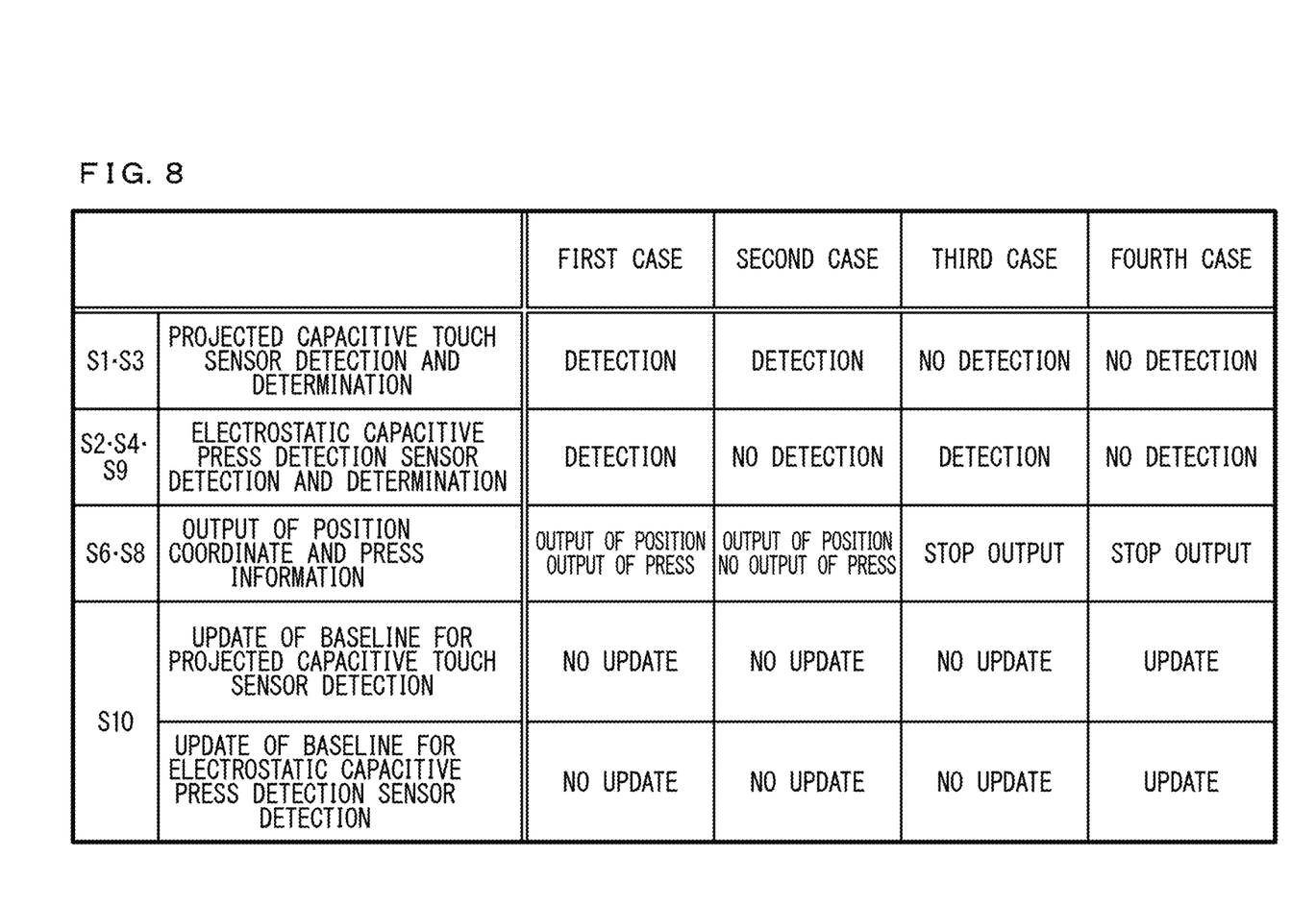
FIG. 8 is a diagram illustrating detection operation of the display apparatus including the touch panel and the touch panel controller according to the first embodiment.

FIG. 8 is a diagram illustrating detection operation of the display apparatus 101 and the touch panel controller 800, and is a diagram in which the operations illustrated in the flowchart of FIG. 7 are organized.

The touch panel controller 800 can add the press information to the position coordinate information according to the measurement results of the projected capacitive touch sensor 102 and the electrostatic capacitive press detection sensor 103 and output as coordinate data to the host apparatus 901. Through the above, when important processing in consideration of safe operation such as button operation is performed in the application processed in the host apparatus 901, a safer control system can be implemented by adding the press information and using the coordinate data.

As described above, the touch panel 1 according to the first embodiment includes: the base substrate 10 having a rectangular shape in plan view, in which the column direction sensor electrode 21 and the row direction sensor electrode 31 configured to detect a touch position of the pointer is formed; the cover panel 13 being fixed to the front surface of the base substrate 10 and being configured to be pressed by the pointer, the first electrode 40 being formed outside of the display region on the back surface of the cover panel 13; and the second electrode 41 being formed outside of the display region on the front surface of the base substrate 10. The first electrode 40 and at least apart of the second electrode 41 overlap in plan view. The second electrode 41 is formed at at least one corner portion of the base substrate 10, and is electrically separated from the column direction sensor electrode 21 and the row direction sensor electrode 31. Pressure when the base substrate 10 is pressed by the pointer through the cover panel 13 is detected by measuring a change of the distance between the first electrode 40 and the second electrode 41 when the front surface of the cover panel 13 is pressed as a change of electrostatic capacitance between the first electrode 40 and the second electrode 41. The touch panel 1 further includes the ground electrode 43 being formed on the outer peripheral side of the first electrode 40 of the cover panel 13.

Further, the display apparatus 101 includes: the touch panel 1; the liquid crystal panel 2 being disposed on the back surface of the touch panel 1; and the backlight unit 60 being disposed on the back surface of the liquid crystal panel 2.

The touch panel 1 includes the first electrode 40 being formed outside of the display region on the back surface of the cover panel 13, and the second electrode 41 being formed outside of the display region on the front surface of the base substrate 10. The second electrode 41 is formed at at least one corner portion of the base substrate 10. Therefore, sensitivity of pressure detection can be enhanced. The touch panel 1 further includes the ground electrode 43 being formed on the outer peripheral side of the first electrode 40 of the cover panel 13. Therefore, by grounding the ground electrode 43, tolerance to static electricity generated due to a touch on the cover panel 13 by the pointer or the like is enhanced.

Note that the present embodiment has described a configuration in which the first electrode 40 and the ground electrode 43 are formed on the back surface side of the black print. However, the black print may be omitted, the black print may be replaced with a pattern having designability, or the first electrode 40 may be black so as to serve as the black print.

Second Embodiment

Figure 9:
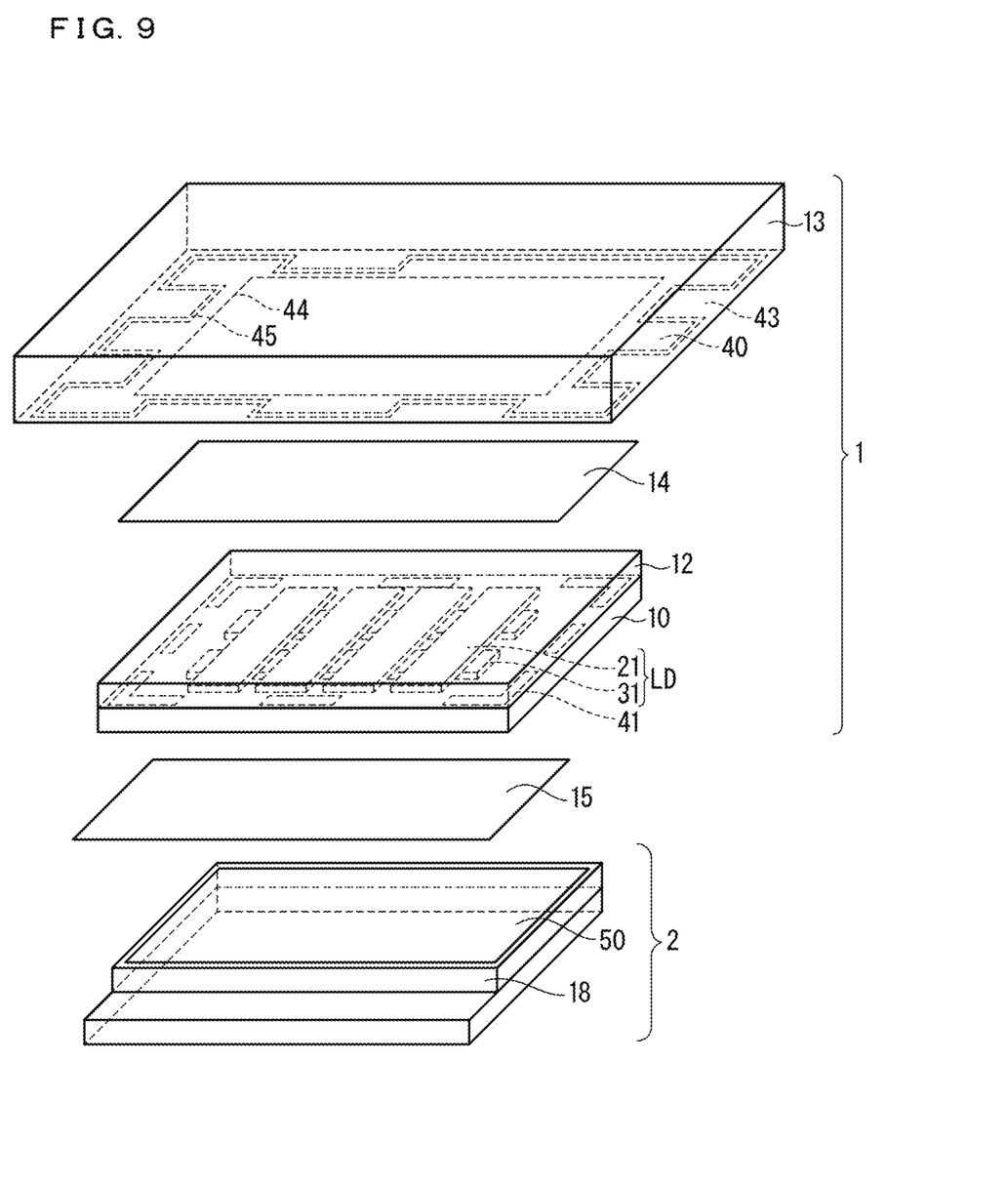
FIG. 9 is an exploded perspective view schematically illustrating a layer configuration of a front surface side of the display apparatus including the touch panel according to the second embodiment.
Figure 10:
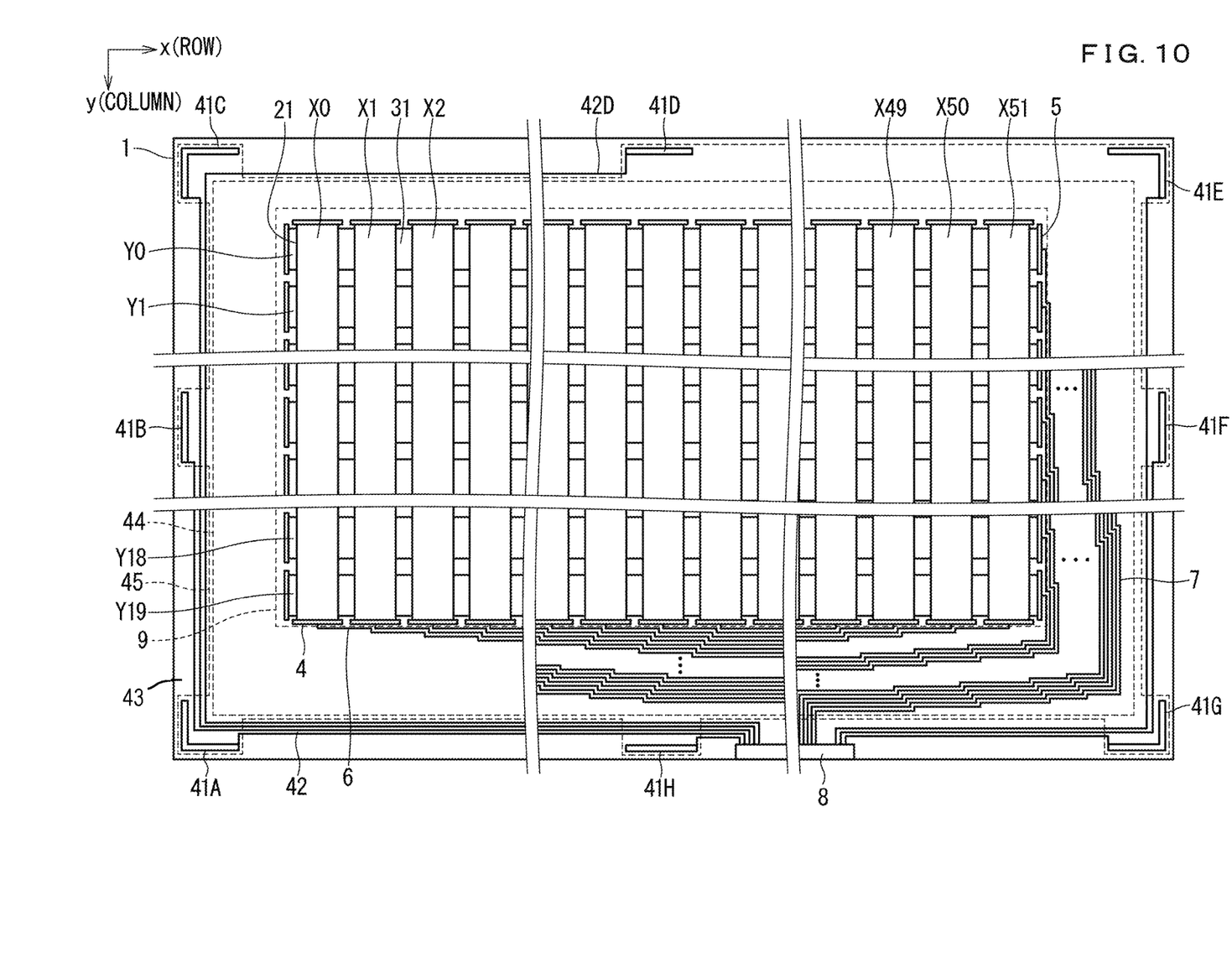
FIG. 10 is a plan view schematically illustrating a configuration of the touch panel according to the second embodiment.
Figure 11:
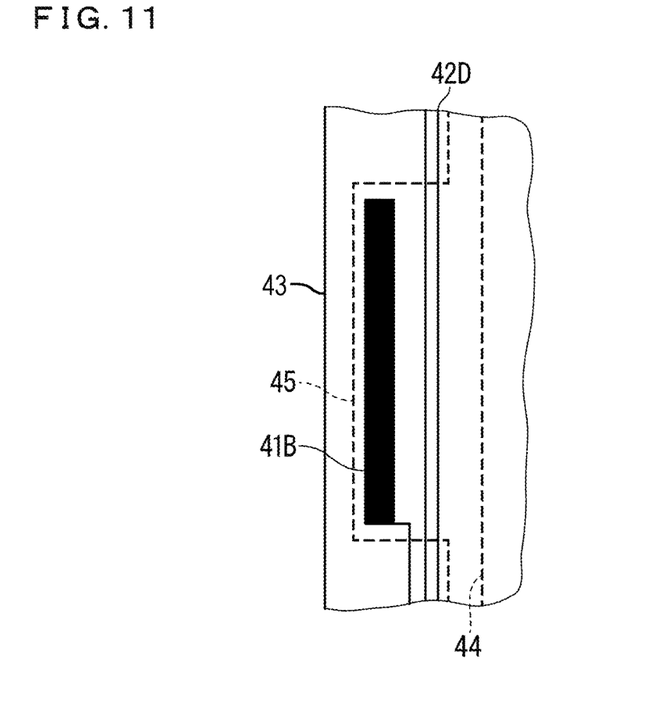
FIG. 11 is a diagram illustrating an example of a positional relationship between the second electrode and the first electrode according to the second embodiment.
Figure 12:
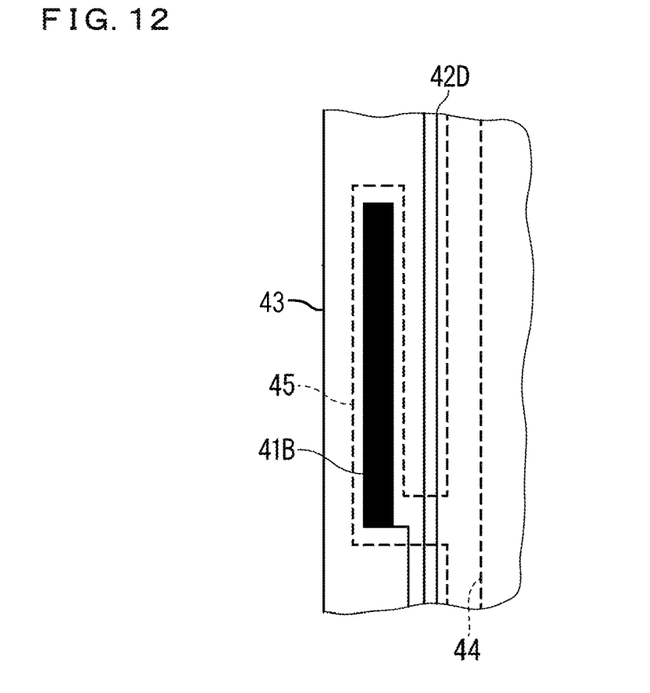
FIG. 12 is a diagram illustrating another example of a positional relationship between the second electrode and the first electrode according to the second embodiment.

Next, the touch panel 1 and the display apparatus 101 according to the second embodiment will be described. FIG. 9 is an exploded perspective view schematically illustrating a layer configuration of a front surface side of the display apparatus 101 including the touch panel 1 according to the second embodiment. FIG. 10 is a plan view schematically illustrating a configuration of the touch panel 1 according to the second embodiment. FIG. 11 is a diagram illustrating an example of a positional relationship between the second electrode 41 and the first electrode 40 according to the second embodiment. FIG. 12 is a diagram illustrating another example of a positional relationship between the second electrode 41 and the first electrode 40 according to the second embodiment. Note that, in the second embodiment, components the same as those described in the first embodiment are denoted by the same reference signs and description thereof will be omitted.

As illustrated in FIG. 9 and FIG. 10, the second embodiment is different from the first embodiment in the following respects: the second electrodes (41B, 41D, 41F, 41H) are added to center portions of four sides of the base substrate 10, and the ground electrode 43 is disposed to overlap leading wires 42 of the second electrodes 41 in plan view.

A total of eight second electrodes 41 are disposed at four corner portions and center portions of four sides in the base substrate 10. By measuring capacitance change in each of the eight second electrodes 41, the difference of the deformation amount generated between the cover panel 13 and the base substrate 10 can be further finely detected.

Further, as illustrated in FIG. 9 and FIG. 11, the boundary 45 between the ground electrode 43 and the first electrode 40 has a projecting and recessed shape in plan view, and portions of the first electrode 40 corresponding to the second electrodes 41, specifically, portions of the first electrode 40 facing the second electrodes 41, have a projecting shape that projects toward the outer peripheral side of the cover panel 13.

By adopting such a shape, as illustrated in FIG. 10, in plan view, each of the second electrodes (41A, 41B, 41C, 41D, 41E, 41F, 41G, 41H) overlaps the first electrode 40, and the most part of the leading wires 42 of the second electrodes 41 overlaps the ground electrode 43.

For example, a leading wire 42D of the second electrode 41D stretches across half the outer periphery of the touch panel 1 to reach the external terminal 8. Capacitance in this portion also influences the capacitance measurement results of the second electrode 41D. However, by covering the leading wire 42D with the ground electrode 43, the influence can be reduced.

As a result, sensitivity of capacitance measurement using the second electrode 41D can be enhanced. This holds true for other second electrodes (41A, 41B, 41C, 41E, 41F, 41G, 41H) as well, and a smaller deformation amount can be obtained as a whole.

Note that, instead of the configuration of FIG. 11, as illustrated in FIG. 12, the boundary 45 between the ground electrode 43 and the first electrode 40 may have a projecting and recessed shape in plan view, and portions of the first electrode 40 corresponding to the second electrodes 41 may have a projecting shape that projects in an extending direction of the side of the cover panel 13. In FIG. 11, the leading wire 42D extending in parallel with the second electrode 41B is covered by the first electrode 40. In FIG. 12, however, the most part of the leading wire 42D extending in parallel with the second electrode 41B is covered by the ground electrode 43, and sensitivity of measurement in the second electrode 41D is enhanced.

In FIG. 9 and FIG. 11, the ground electrode 43 has different shapes but is the same as in the first embodiment in that the ground electrode 43 is present on the outermost side among all the components. Therefore, similarly to the case of the first embodiment, an effect that tolerance to static electricity is enhanced can be obtained.

Note that the detection operation of the display apparatus 101 and the touch panel controller 800 is different from that of the first embodiment only in the number of second electrodes (41A, 41B, 41C, 41E, 41F, 41G, 41H) used for measurement of the electrostatic capacitance, and thus description thereof will be omitted.

As described above, in the touch panel 1 according to the second embodiment, as illustrated in FIG. 9 and FIG. 11, the boundary 45 between the ground electrode 43 and the first electrode 40 has a projecting and recessed shape in plan view, and portions of the first electrode 40 corresponding to the second electrodes 41 have a projecting shape that projects toward the outer peripheral side of the cover panel 13. Therefore, tolerance to static electricity can be enhanced, and sensitivity of pressure detection can further be enhanced.

Further, in the touch panel 1, as illustrated in FIG. 12, the boundary 45 between the ground electrode 43 and the first electrode 40 has a projecting and recessed shape in plan view, and portions of the first electrode 40 corresponding to the second electrodes 41 have a projecting shape that projects toward the extending direction of the side of the cover panel 13. Therefore, tolerance to static electricity can be enhanced, and sensitivity of pressure detection can further be enhanced than in the case of FIG. 9 and FIG. 11.

Third Embodiment

Figure 13:
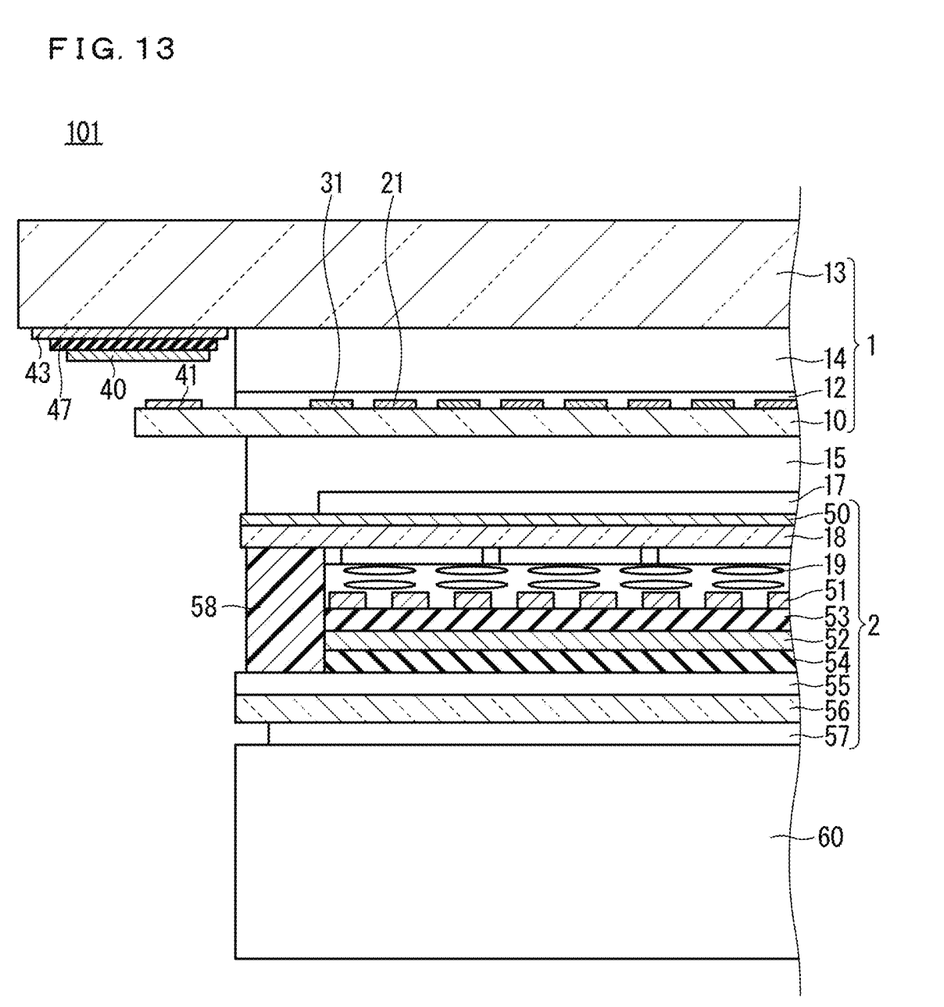
FIG. 13 is a partial cross-sectional diagram schematically illustrating a configuration of the display apparatus including the touch panel according to the third embodiment.

Next, the touch panel 1 and the display apparatus 101 according to the third embodiment will be described. FIG. 13 is a partial cross-sectional diagram schematically illustrating a configuration of the display apparatus 101 including the touch panel 1 according to the third embodiment. Note that, in the third embodiment, components the same as those described in the first and second embodiments are denoted by the same reference signs and description thereof will be omitted.

As illustrated in FIG. 13, the third embodiment is different from the first embodiment in the positional relationship between the first electrode 40 and the ground electrode 43, which have a layered structure.

The touch panel 1 further includes an insulation layer 47 that is formed on a surface of the ground electrode 43 on the opposite side of the cover panel 13. The first electrode 40 is formed on the cover panel 13 with the ground electrode 43 and the insulation layer 47 being interposed therebetween. In this configuration, the first electrode 40 and the second electrodes 41 are entirely covered by the ground electrode 43. Therefore, the shielding effect of electrostatic capacitance formed between the pointer and the second electrodes 41 can be enhanced, and tolerance to static electricity can be enhanced.

As described above, the touch panel 1 according to the third embodiment further includes the ground electrode 43 being formed outside of the display region on the back surface of the cover panel 13, and the insulation layer 47 being formed on the surface of the ground electrode 43 on the opposite side of the cover panel 13. The first electrode is formed on the cover panel 13 with the ground electrode 43 and the insulation layer 47 being interposed between the first electrode 40 and the cover panel 13. Therefore, tolerance to static electricity can be enhanced, and sensitivity of pressure detection can further be enhanced.

Note that, in the present embodiment, the ground electrode 43 is directly formed on the back surface of the cover panel 13. Regarding this, however, a black print or a pattern having designability may be formed between the cover panel 13 and the ground electrode 43. Alternatively, the ground electrode 43 may be formed in black with black printing.

<Other Modifications>

In the above description, each of the first electrode 40, the second electrode 41, and the ground electrode 43 is integrally formed. Regarding this, however, a formation method adapted for a manufacturing facility may be employed, such as a method in which the electrodes are separately formed into right and left and are then connected with a metal electrode or the like.

Further, the second embodiment has described a configuration in which the second electrodes 41 are disposed at four corner portions and center portions of four sides of the base substrate 10. However, the second electrodes 41 may be disposed at other positions if the positions include at least one or more corner portions, and may be disposed at some of the positions out of the eight positions, or may be disposed at nine or more positions.

Further, the foregoing description is based on the assumption that the display apparatus 101 is a liquid crystal module, but the display apparatus 101 is not limited to this. The present disclosure can also be applied to display apparatuses using organic electro luminescence (EL) or another display method.

Note that each embodiment can be freely combined, or each embodiment can be modified or omitted as appropriate.

While the disclosure has been shown and described in detail, the foregoing description is in all aspects illustrative and not restrictive. It is therefore understood that numerous modifications and variations can be devised.

What is claimed is:

1. A touch panel comprising:
a touch sensor substrate having a rectangular shape in plan view, in which a sensor electrode configured to detect a touch position of a pointer is formed;
a cover panel being fixed to one surface of the touch sensor substrate and being configured to be pressed by the pointer;
a first electrode being formed outside of a display region on a surface of the cover panel on an opposite side of a surface to be pressed by the pointer; and
a second electrode being formed outside of the display region on the one surface of the touch sensor substrate, wherein
the first electrode and at least a part of the second electrode overlap in plan view,
the second electrode is formed at at least one corner portion of the touch sensor substrate, and is electrically separated from the sensor electrode,
pressure when the touch sensor substrate is pressed by the pointer through the cover panel is detected by measuring a change of a distance between the first electrode and the second electrode when the surface of the cover panel to be pressed by the pointer is pressed as a change of electrostatic capacitance between the first electrode and the second electrode,
the touch panel further comprises a ground electrode being formed on the cover panel at an outer peripheral side of the first electrode of the cover panel,
a boundary between the ground electrode and the first electrode has a projecting and recessed shape in plan view, and
a portion of the first electrode corresponding to the second electrode has a projecting shape projecting toward an outer peripheral side of the cover panel or a projecting shape projecting toward an extending direction of a side of the cover panel.

2. The touch panel according to claim 1, further comprising
a leading wire configured to connect an external terminal and the second electrode, wherein
the ground electrode is formed to overlap at least a part of the leading wire in plan view.

3. A display apparatus comprising:
the touch panel according to claim 1;
a liquid crystal panel being disposed on a back surface of the touch panel; and
a backlight unit being disposed on a back surface of the liquid crystal panel.

4. The touch panel according to claim 1, wherein
the second electrode includes a first elongated section extending along a first direction of one edge of the touch sensor substrate and a second elongated section extending along a second direction of another edge of the touch sensor substrate that is transverse to the first direction.

5. A touch panel comprising:
a touch sensor substrate having a rectangular shape in plan view, in which a sensor electrode configured to detect a touch position of a pointer is formed;
a cover panel being fixed to one surface of the touch sensor substrate and being configured to be pressed by the pointer;
a first electrode being formed outside of a display region on a surface of the cover panel on an opposite side of a surface to be pressed by the pointer;
a second electrode being formed outside of the display region on the one surface of the touch sensor substrate; and
a leading wire configured to connect an external terminal and the second electrode, wherein
the first electrode and at least a part of the second electrode overlap in plan view,
the second electrode is formed at at least one corner portion of the touch sensor substrate, and is electrically separated from the sensor electrode,
pressure when the touch sensor substrate is pressed by the pointer through the cover panel is detected by measuring a change of a distance between the first electrode and the second electrode when the surface of the cover panel to be pressed by the pointer is pressed as a change of electrostatic capacitance between the first electrode and the second electrode,
the touch panel further comprises a ground electrode being formed on an outer peripheral side of the first electrode of the cover panel,
the ground electrode is formed to overlap at least a part of the leading wire in plan view,
a boundary between the ground electrode and the first electrode has a projecting and recessed shape in plan view, and
a portion of the first electrode corresponding to the second electrode has a projecting shape projecting toward an outer peripheral side of the cover panel or a projecting shape projecting toward an extending direction of a side of the cover panel.

* * * * *